(12) United States Patent
Komatsu et al.

(10) Patent No.: US 6,281,644 B1
(45) Date of Patent: Aug. 28, 2001

(54) COMBINED LINEAR MOTOR

(75) Inventors: Toshiteru Komatsu; Koji Eba; Katsuyoshi Kitagawa, all of Aichi; Yasuhiro Miyamoto; Takashi Nagase, both of Kitakyushu, all of (JP)

(73) Assignees: Okuma Corporation, Nagoya; Kabushiki Kaisha Yaskawa Denki, Fukuoka, both of (JP)

( * ) Notice: Subject to any disclaimer, the term of this patent is extended or adjusted under 35 U.S.C. 154(b) by 0 days.

(21) Appl. No.: 09/553,312

(22) Filed: Apr. 20, 2000

(30) Foreign Application Priority Data

Apr. 26, 1999 (JP) .................................................. 11-117950

(51) Int. Cl.$^7$ ........................................................ H02P 7/74
(52) U.S. Cl. ............................................. 318/38; 310/12
(58) Field of Search ........................ 318/38, 135; 310/12, 310/13, 14

(56) References Cited

U.S. PATENT DOCUMENTS 4,853,602 * 8/1989 Hommes et al. ........................ 318/38

* cited by examiner

*Primary Examiner*—Elvin Enad
*Assistant Examiner*—Judson H. Jones
(74) *Attorney, Agent, or Firm*—Oliff & Berridge, PLC

(57) ABSTRACT

To prevent adverse effect, on machining accuracy, of cogging thrust of linear motors when used in a combined linear motor driving a machine tool. Three linear motor movers are fixedly attached to a moving table of a machine tool, while three linear motor stators are fixedly attached to a base. The three linear motors are driven in parallel to thereby drive the moving table. The respective linear motor stators are fixed to the base so as to have fixed phases relative to the base, stepwisely displaced by an electrical angle 60° whereby cogging thrust is leveled in the entire combined linear motor.

2 Claims, 4 Drawing Sheets

COMBINED LINEAR MOTOR

BACKGROUND OF THE INVENTION

1. Field of the Invention

The present invention relates to a combined linear motor in which a plurality of linear motors are operated in parallel, and in particular to a combined linear motor for driving a moving table of a machine tool.

2. Description of the Related Art

FIG. 4 shows a conventional combined linear motor for driving a moving table of a machine tool. A moving table here is defined as a table of a machine tool, to which a spindle or a tool rest of the machine tool is attached. In the following, a device having three linear motors operating in parallel will be taken as an example of a conventional linear motor.

The conventional device comprises a machine tool part and an NC control part. The machine tool part comprises a base 5 fixedly attached by a plurality of table stoppers 1 for limiting strokes of the moving table, linear guide rails 2, a position detector 3, and linear motor stators 4a, 4b, 4c, and a moving table 9 attached by a linear guide 6, a position detector reader 7, and linear motor movers 8a, 8b, 8c. The NC control part comprises an NC device 10, a servo control section 11, a current distribution operating circuit 12, and current amplifiers 13a, 13b, 13c. In this drawing, only the outline of the moving table 9 is shown for explanation of installation parts beneath the moving table.

In each of the three linear motors employed in the above conventional example, a stator and a mover consist of a magnet and a wire, respectively. Alternatively, other combinations may be possible for a stator and a mover, such as wires and magnets, wires and wires, and so on.

The moving table 9 is moved under movement control, which is achieved in cooperation with the NC device 10, the servo controller 11, the current distribution operating circuit 12, and the current amplifiers 13a, 13b, 13c. The NC device 10 outputs a position command. The servo controller 11 calculates and outputs a current command based on the position command from the NC device 10 and data on a present position supplied from the position detection reader 7. The current distribution operating circuit 12 outputs current distribution commands for the respective motors operating in different phases, based on the data on the present position and the current command. The current amplifiers 13a, 13b, 13c output currents having respective phases based on the current distribution commands, to the movers 8a, 8b, 8c of the linear motors.

Instead of the three linear motors employed in the above conventional art for parallel driving, a fourth or more motor/motors may be provided in response to a demand for a larger thrust. Specifically, addition of a linear motor mover and stator and a current amplifier, which together constitute a fourth linear motor, could easily attain a table moving mechanism with a larger thrust.

In any case, in this conventional device, a single moving table 9 is driven by two or more linear motors, which are driven in parallel at the same time.

When a linear motor is used as a driving source of a moving device of a machine tool, cogging trust of the linear motor may affect machining accuracy. Therefore, as much cogging trust as possible must be suppressed especially in precise or highly accurate machining. Note that "cogging thrust" here corresponds to cogging torque with a rotary motor.

However, generally, suppression of cogging thrust is subject to limits as circular arrangement of movers is not allowed with a linear motor, of which strokes are inevitably limited due to the structure thereof, in other words, due to the existence of both ends of the motor all the time.

In particular, when two or more linear motors are driven in parallel to attain high thrust according to conventional arts described above, phases of cogging thrust of the respective linear motors are made coincident with one another. This may cause a problem of an increase in cogging trust of the linear motors in proportion to the number of linear motors in use.

SUMMARY OF THE INVENTION

In order to address the above problem, according to the present invention, there is provided a combined linear motor for simultaneously driving a plurality of linear motors in parallel to thereby drive a moving body, in which the plurality of linear motors are divided into groups of i in number, and a stator or a mover in each group is arranged such that its phase is stepwisely displaced from that in another group by $360°/(2*i)°$.

Also, a combined linear motor of the present invention comprises a single position detector for detecting a position of the moving body, and a current distribution operating circuit provided for each group of linear motors. Each current distribution operating circuit calculates optimum supply current for a corresponding linear motor, based on the position detection information supplied from the position detector and displaced angels of the respective linear motors.

Further, in a combined linear motor (a linear motor driving device) comprising a guiding means and N (N: a natural number) units of linear motors, the N units of linear motors are divided into i (i: a natural number equal to or more than 2, or $i \geq 2$) groups, each group including j (j: a natural number) units of linear motors, holding the relationship $N=I*j$. A displacement angle $\psi(k)$ of a motor electrical angle of a linear motor/motors in the k-th group (k: a natural number wherein $1 \leq k \leq i$) in the i groups, relative to motor electrical angle of a linear motor/motors in the first group, an be obtained from the following expression (1). Note that the motor electrical angle of the linear motor/motors in the first group an be obtained with k=1.

$$\psi(k)=360*(k-1)/(2*i)° \tag{1}$$

By installing the respective linear motors such that their motor electrical angles are displaced by the calculated displaced angle $\psi(k)$, cogging thrust associated with the relative linear motors can be offset as a whole.

BRIEF DESCRIPTION OF THE DRAWINGS

The above and other objects, features, and advantages of the present invention will become further apparent from the following description of the preferred embodiment taken in conjunction with the accompanying drawings wherein.

DESCRIPTION OF THE PREFERRED EMBODIMENT

Figure 1:
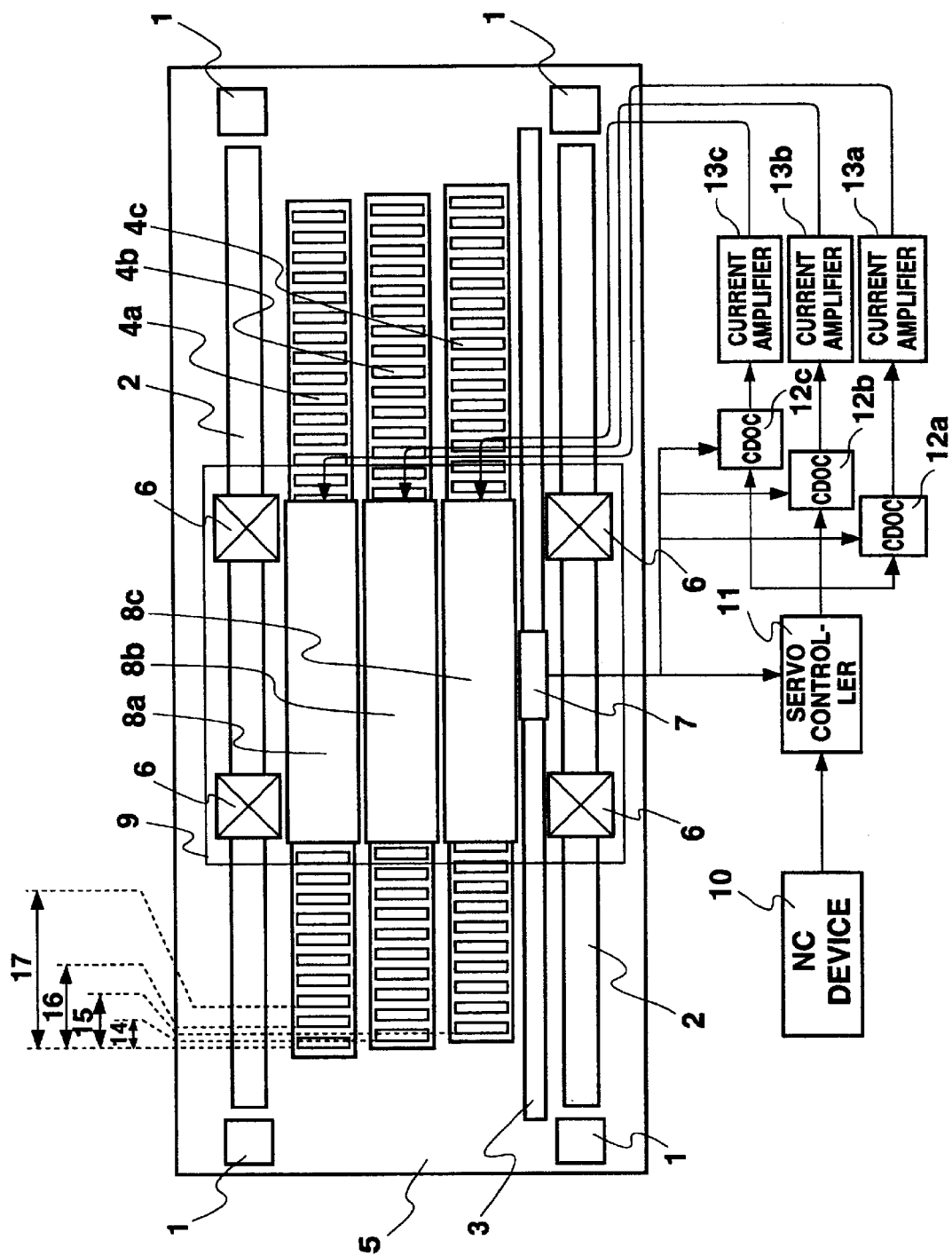
FIG. 1 is a top view, from above a moving table, of a mechanical structure and a control section of a machine tool according to a preferred embodiment of the present invention in the form of a combined linear motor comprising three linear motors.
Figure 2:
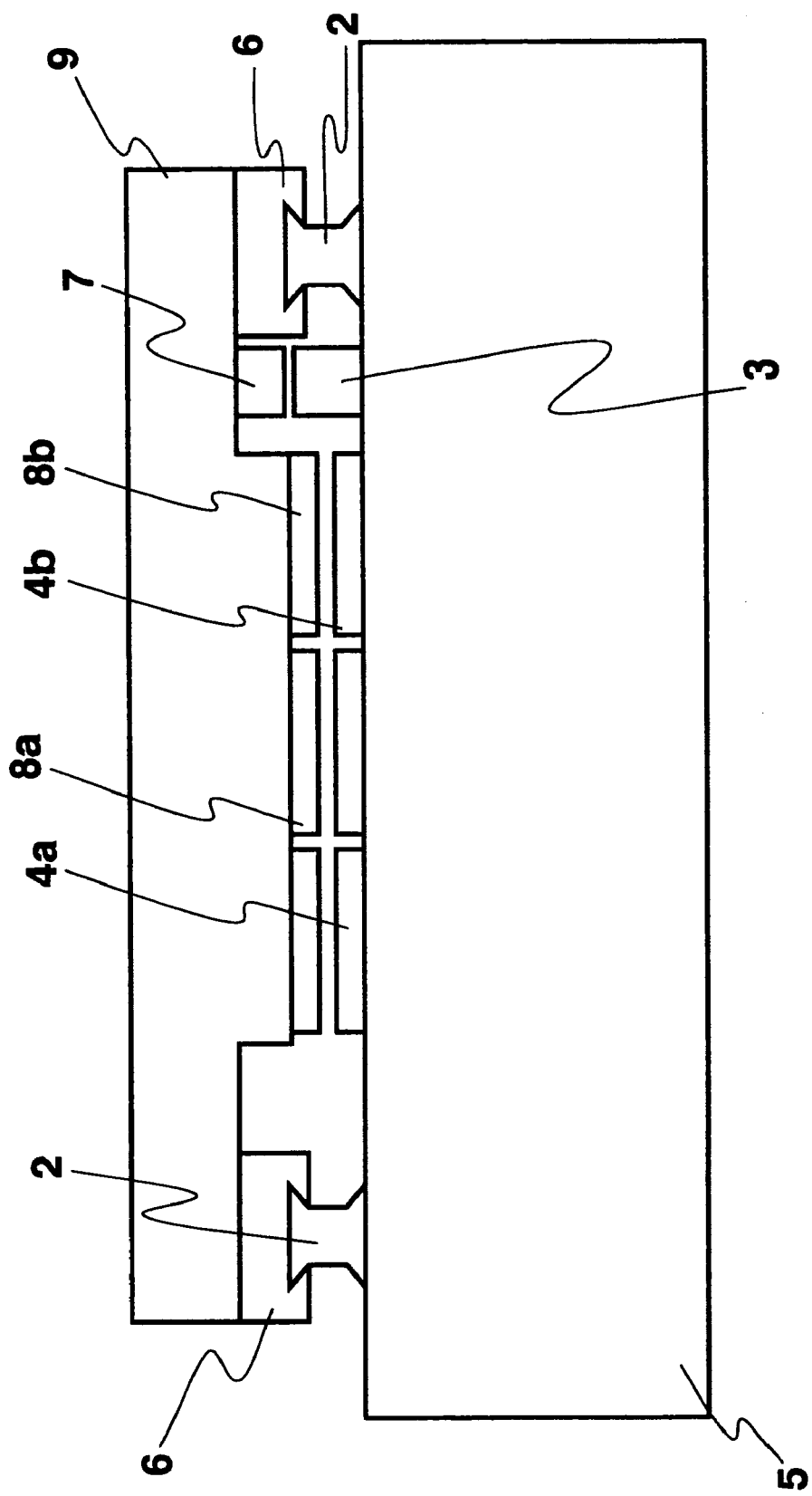
FIG. 2 is a lateral cross sectional view of the mechanical structure of FIG. 1.

FIGS. 1 and 2 show a preferred embodiment of the present invention.

In this embodiment, the present invention is applied to a moving table driving device of a machining tool comprising three linear motors, as described in the above related art section. The driving device comprises a machine tool section and an NC control section. The machine tool section comprises a base 5 fixedly attached by a plurality of table stoppers 1 for limiting strokes of the moving table, linear guide rails 2, a position detector 3, and linear motor stators 4a, 4b, 4c, and a moving table 9 attached by a linear guide 6, a position detector reader 7, and linear motor movers 8a, 8b, 8c. The NC control section comprises an NC device 11, a servo controller 11, and servo driving circuits 12a, 12b, 12c as current distribution operating circuits. In each of the three linear motors used in this embodiment, the stators and movers consist of magnets and wires, respectively. Alternatively, other combinations, such as wires and magnets, wires and wires, may be applicable for a linear motor.

Phase displacement among the respective linear motors in the present invention will next be described.

For the three linear motors in FIG. 1, the following expression (1-1) can be obtained from the expression (1) with N=3, i=3, j=1.

$$\psi(k) = 60 * (k-1)°\quad(1\text{-}1)$$

When k=1, k=2, K=3 represent first, second, and third linear motors, respectively, ψ(k) for the respective linear motors is determined as 0°, 60°, 120°, respectively.

Relationship between the number of linear motor groups, or i, and a phase displacement angle ψ(k) for each linear motor is as follows.

1) i=2

$$\psi(1)=0°, \psi(2)=90°,$$

2) i=3

$$\psi(1)=0°, \psi(2)=60°, \psi(3)=120°,$$

3) i=4

$$\psi(1)=0°, \psi(2)=45°, \psi(3)=90°, \psi(4)=135°$$

A generic expression with i=n is $$\psi(1)=0° \ldots$$

$$\psi(k)=360*(k-1)/(2*n)° \ldots$$

$$\psi(n)=360*(n-1)/(2*n)°$$

wherein $1 \leq k \leq n$.

With six linear motors, or N=6, three ways are available for realizing such displaced motor electrical angles, namely i=2 and j=3, i=3 and j=2, i=6 and j=1.

In the embodiment shown in FIG. 1, displaced angles are achieved through displaced installation of stators from one another. Specifically, a stator of a second linear motor is installed in a position displaced from an installation position of a first linear motor stator by a motor electrical angle of 60°, which corresponds to the section 14. Similarly, a stator of a third linear motor is installed in a position displaced from an installation position of the first linear motor stator by a motor electrical angle of 120°, which corresponds to the section 15. Note that the sections 16 and 17 in FIG. 1 represent a distance corresponding to one magnetic pole pitch of a linear motor, and a distance corresponding to one motor electrical angle cycle thereof, respectively.

It should be noted that a displaced angle can be achieved using methods other than the above, including displaced installation of movers only, or of both movers and stators, though all methods are based on the same principle.

FIG. 2 is a cross sectional view of a linear motor driving device along the midst part of the moving table, showing positional relationship among structural components in FIG. 1.

Figure 3:
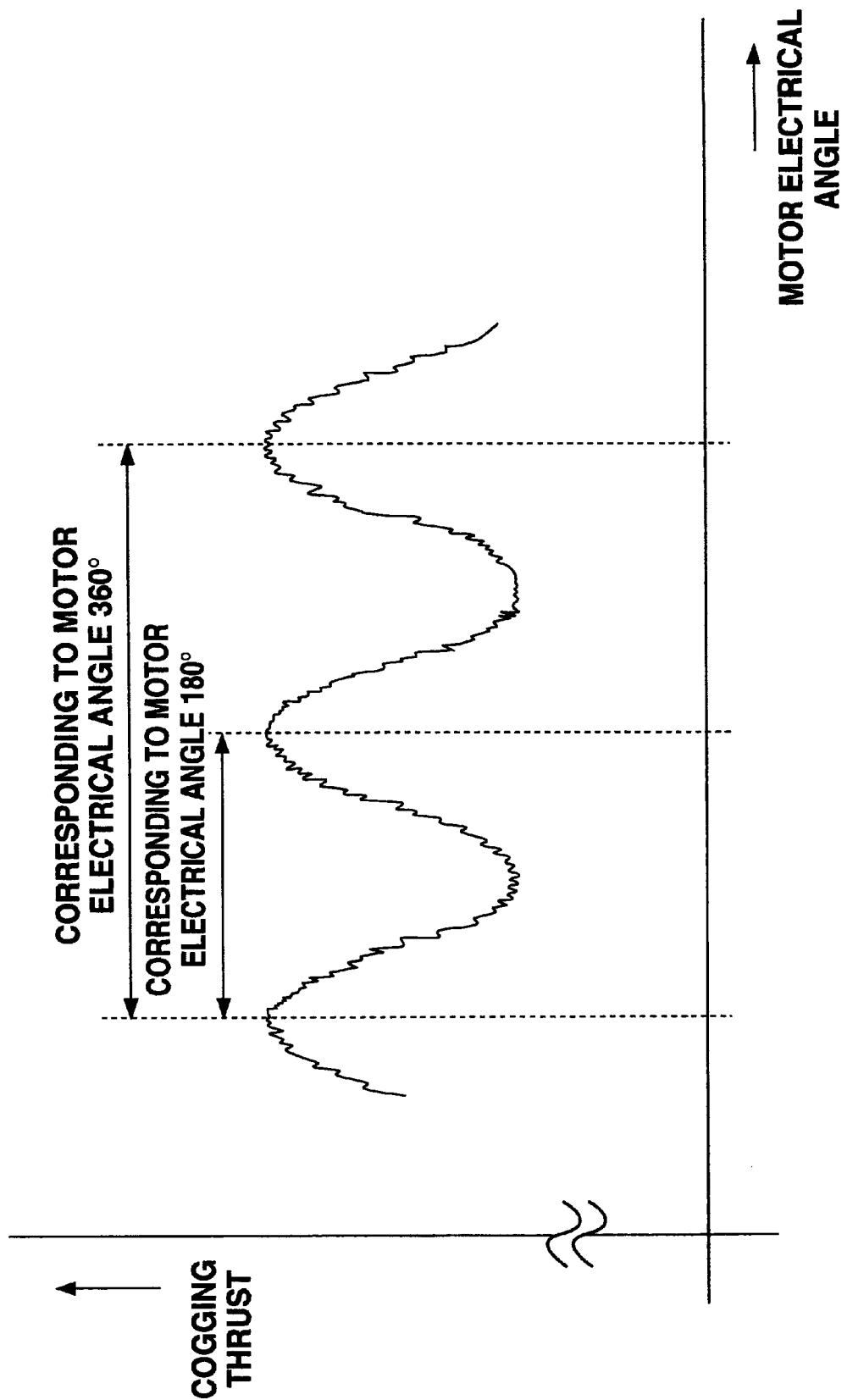
FIG. 3 is a diagram illustrating waveforms of cogging thrust of a single linear motor.

FIG. 3 is a diagram showing cogging thrust waveforms of a linear motor used in this embodiment. Linear motor cogging thrust exhibits a periodic waveform, each cycle corresponding to one magnetic pitch, and can be expressed as a function of a motor electrical angle. In the drawing, the vertical axis represents thrust, while the horizontal axis represents a motor electrical angle depending on the position of a linear motor.

A specific method for installing a linear motor stator will be described.

Provided that a magnetic pitch distance 16 is 30 mm in FIG. 1, the distance 17, corresponding to one motor electrical angle cycle, should be 60 mm. Based on the above, a distance between first and second linear motor stators should be 10 mm, corresponding to a motor electrical angle 60°, as obtained from expression (1), and that between first and third linear motor stators should be 20 mm, corresponding to a motor electrical angle 120°. Therefore, with installation of the respective stators displaced by 10 mm and 20 mm relative to the first linear motor stator, respectively, cogging thrusts can be offset among the three linear motors, whereby cogging thrust characteristics can be improved.

Next description will be given for control of supplying current in the above embodiment.

Figure 4:
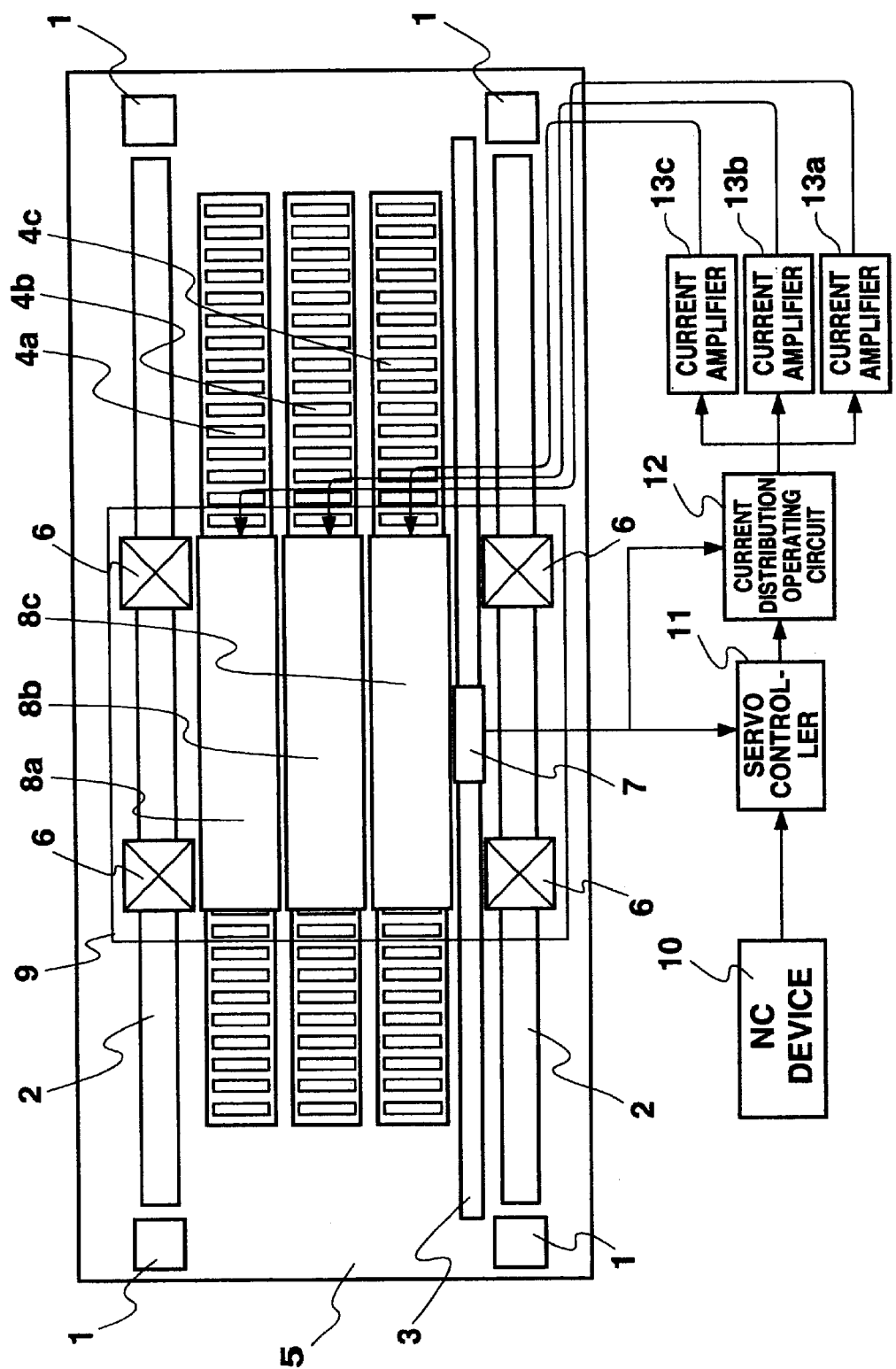
FIG. 4 is a top view, from above a moving table, of a mechanical structure and a control section of a conventional combined linear motor comprising three linear motors.

When one NC device 10 is used to control a plurality of linear motors according to a conventional art, a current command obtained in a single current distributing operating circuit 12 will be supplied to the current amplifiers 13a, 13b, 13c for the respective motors, as shown in FIG. 4. With this arrangement, two of the three linear motors will not receive optimum supplying current because motor positions are displaced for every linear motor for improved cogging thrust characteristics, as described above. As a result, thrust of some linear motors may drop, leading to a decrease in total thrust.

Here, a regulated thrust F ($0 \leq F \leq 1$) may be expressed as follows with a displacement θ° of a motor electrical angle relative to a supply current to a linear motor, and thrust without displacement being 1.

$$F = \cos \theta \quad(2)$$

The entire linear motor thrust Fa can be obtained using expression (2) when supply currents to the above three linear motors are made coincident with a motor electrical angle of the second linear motor.

$$Fa = F1 + F2 + F3$$
$$= \cos(-60) + \cos(0) + \cos(60)$$
$$= 0.5 + 1 + 0.5$$
$$= 2$$

wherein, F1, F2, F3 refer to thrust of first, second, and third linear motors, respectively.

That is, when identical current is supplied to the three linear motors, resultant total thrust Fa would be equivalent to that corresponding to only two linear motors.

In order to address this problem, movement control for the moving table 9 in this embodiment shown in FIG. 1, is achieved through production, in the current amplifiers 13a, 13b, 13c, of currents with different phases to be applied to the respective three linear motor movers 8a, 8b, 8c. Specifically, there are provided an NC device 10 for outputting a position command, a servo controller 11 for calculating and outputting a current command based on the position command and data on the current position supplied from the position detector reader 7, and three current distribution operation circuits 12a, 12b, 12c, each for each linear motor, for setting displacement angles for the linear motors in advance, and calculating and outputting current distribution commands based on the displacement angles and the current position.

As described above, according to the present invention, cogging thrust of the entire combined linear motor can be significantly reduced through use of a plurality of linear motors with phase displacement set between each of such linear motors. This allows highly accurate machining.

Also, a linear motor utilized for the present invention, comprising a pair of a mover and a stator, can produce an advantage when used in combination of two or more units. Therefore, a special magnet arrangement or wiring structure is unnecessary for each linear motor. This can facilitate manufacturing, and therefore is advantageous in view of productivity and costs. Further, according to the present invention, a combined linear motor using a single position detector can sufficiently prevent a drop in total motor thrust even without a dedicated position detector for each motor.

What claimed is:

1. A combined linear motor, comprising:

a plurality of linear motors for being driven in parallel to thereby move a moving body, wherein the plurality of linear motors are divided into i groups, and stator or mover in each group is arranged having a motor electrical angle stepwisely displaced by $360°/(2*i)°$ from a motor electrical angle of stator or mover in other group.

2. A combined linear motor according to claim 1, further comprising:

a single position detector for detecting a position of the moving body; and a current distribution operation circuit provided for each group of linear motors, wherein the current distribution operation circuit calculates supplying current optimum for a corresponding linear motor based on position information output from the position detector and a displacement angle of each linear motor.

* * * * *